(12) United States Patent
Shibata

(10) Patent No.: US 7,983,543 B2
(45) Date of Patent: Jul. 19, 2011

(54) IMAGING APPARATUS AND IMAGING METHOD

(75) Inventor: Nobuhiro Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 12/332,215

(22) Filed: Dec. 10, 2008

(65) Prior Publication Data

US 2009/0154911 A1 Jun. 18, 2009

(30) Foreign Application Priority Data

Dec. 14, 2007 (JP) .................................. 2007-322847

(51) Int. Cl.
*G03B 17/00* (2006.01)
(52) U.S. Cl. ............................................ 396/52; 396/55
(58) Field of Classification Search .................. 396/50, 396/52, 53, 55; 348/208.99, 208.12–208.7, 348/208.11
See application file for complete search history.

(56) References Cited

U.S. PATENT DOCUMENTS

| 5,335,032 | A | 8/1994 | Onuki | |
|---|---|---|---|---|
| 7,123,290 | B2 * | 10/2006 | Ohishi | 348/208.4 |
| 2006/0204232 | A1 * | 9/2006 | Weinberg et al. | 396/50 |
| 2007/0183762 | A1 * | 8/2007 | Washisu | 396/53 |

FOREIGN PATENT DOCUMENTS

| JP | 2960796 B | 7/1999 |
|---|---|---|
| JP | 2002-207232 A | 7/2002 |

* cited by examiner

*Primary Examiner* — Clayton E Laballe
*Assistant Examiner* — Minh Q Phan
(74) *Attorney, Agent, or Firm* — Canon USA, Inc. IP Div

(57) ABSTRACT

An imaging apparatus includes an imaging unit configured to convert an object image into an image signal, a vibration detection unit configured to detect a vibration and output information about the vibration, a correction unit moving in a plane orthogonal to an optical axis configured to correct the vibration, a target position calculation unit configured to calculate a target position to which the correction unit is moved based on the information about the vibration output from the vibration detection unit, a position detection unit configured to detect a present position of the correction unit, a calculation unit configured to calculate a difference between the present position and the target position, and a determination unit configured to determine whether a force acting on the imaging apparatus is a gravitational force based on the information about the vibration and a cycle of the vibration.

8 Claims, 8 Drawing Sheets

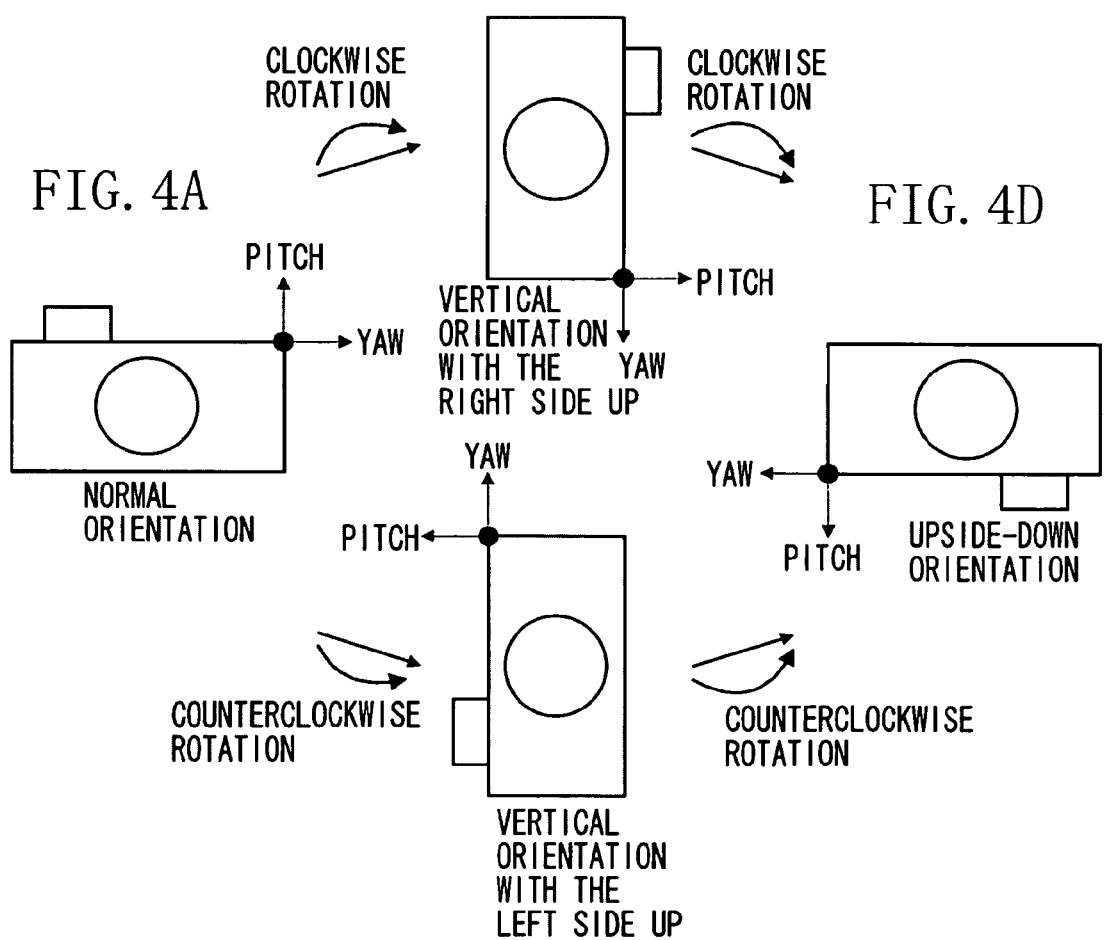

FIG. 5A

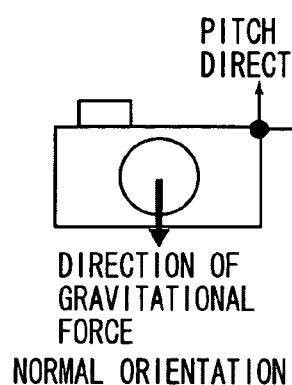

PITCH DIRECTION
YAW DIRECTION
DIRECTION OF GRAVITATIONAL FORCE
NORMAL ORIENTATION

IMAGING APPARATUS IS TURNED FROM THE NORMAL ORIENTATION TO THE VERTICAL ORIENTATION WITH THE LEFT SIDE UP →

FIG. 5B

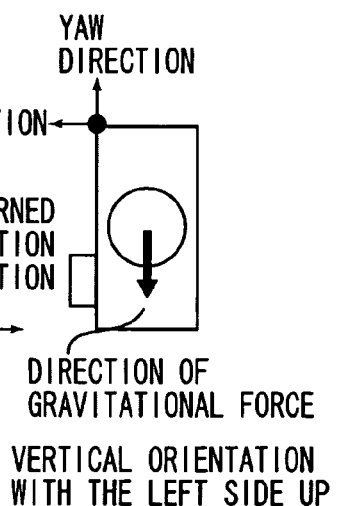

YAW DIRECTION
PITCH DIRECTION
DIRECTION OF GRAVITATIONAL FORCE
VERTICAL ORIENTATION WITH THE LEFT SIDE UP

FIG. 5C

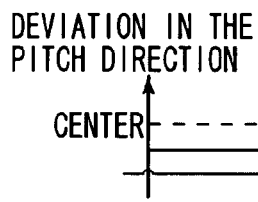

DEVIATION IN THE PITCH DIRECTION
CENTER
TIME

FIG. 5D

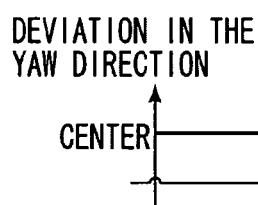

DEVIATION IN THE YAW DIRECTION
CENTER
TIME

FIG. 5E

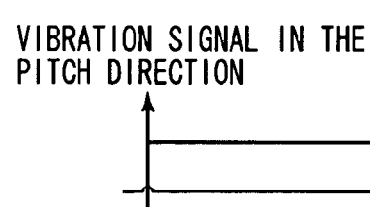

VIBRATION SIGNAL IN THE PITCH DIRECTION
TIME

FIG. 5F

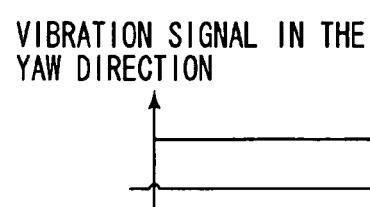

VIBRATION SIGNAL IN THE YAW DIRECTION
TIME

IMAGING APPARATUS AND IMAGING METHOD

BACKGROUND OF THE INVENTION

1. Field of the Invention

The present invention relates to an imaging apparatus which converts an object image to an image signal via an imaging unit and has an image stabilizing function.

2. Description of the Related Art

Recently, an imaging apparatus as typified by a still camera and a video camera includes an image stabilizing device for correcting a vibration such as camera shake which is transmitted to the device from outside. Image stabilizing methods used in the image stabilizing device may include a method which is performed by moving an optical system (hereinafter referred to as an "optical image stabilizing method") and a method which is performed by moving a charge-coupled device (CCD) as an image sensor (hereinafter referred to as a "CCD image stabilizing method").

In the above described methods, a vibration correction amount for canceling a vibration is calculated by performing operations concentrating on a process for performing a predetermined frequency cutoff and an integral process in which units of an input and output are matched, with respect to a signal from a sensor for detecting the vibration (e.g., a gyro sensor). A vertical direction (pitch) and a horizontal direction (yaw) are typical directions in detecting the vibration, when the imaging apparatus is placed at a center of an orthogonal coordinate system (see FIG. 3).

The optical image stabilizing method removes the vibration from an image formed on an image sensor by moving a correction lens as a correction optical system by an amount for correcting the vibration using actuators driven on a plane in a direction perpendicular to each other. The CCD image stabilizing method removes the vibration from an image by moving an image sensor by an amount of the vibration by using actuators driven on a plane in a direction perpendicular to each other. Since both of the above methods relate to the method according to the present invention, constitution of the optical image stabilizing method will be described below as a representative example of the image stabilizing method.

In the imaging apparatus including the image stabilizing device, the correction lens to be controlled is moved to a target position by instructing the actuators to move the correction lens by an amount for correcting a vibration, and a present position of the correction lens is obtained at the time the correction lens is moved to the target position. Then, a feedback control is performed so as to make a deviation between the target position and the present position zero.

Japanese Patent No. 2,960,796 discusses a technique for determining an orientation of an imaging apparatus in which an obtained deviation of a correction lens or a change of an offset in the deviation caused by a gravitational force is detected as a change of a current value of an actuator. In the patent, a signal of a vibration sensor for detecting a vibration is also used while the orientation of the imaging apparatus is detected. Japanese Patent Application Laid-Open No. 2002-207232 discusses that a camera-shake correction property is switched according to a panning operation for shifting an imaging range in a horizontal direction and a tilting operation for shifting the imaging range in a vertical direction.

In general, in a system for detecting an orientation of an imaging apparatus by using a movable member such as a correction lens whose position changes by action of the gravitational force, a change of a present position of the movable member is regarded as a change of a deviation or a change of an offset contained in the deviation. Therefore, a change of the orientation can be determined based on the change of the present position. Similarly, when a predetermined acceleration is applied to the imaging apparatus while the imaging apparatus keeps the present orientation (when an external force other than the gravitational force, for example, the external force according to a panning operation is applied), the system behaves as if the gravitational force is acting on the movable member due to an inertial force.

In this case, an orientation of an image happens to be switched even when the orientation is not changed in the imaging apparatus, if, for example, the imaging apparatus has a function of switching the orientation of the image to be photographed or the orientation of the photographed image according to the orientation of the imaging apparatus. As a result, the image may be switched to an orientation a photographer does not intend, for example, when the photographer carries out a panning operation during taking images. Further, in a case where the photographed image is reproduced, the image happens to be switched to an orientation an observer does not expect.

As described above, in the system for detecting the orientation by using the movable member, it has been difficult to determine whether a force acting on the imaging apparatus is the gravitational force or an external force other than the gravitational force.

SUMMARY OF THE INVENTION

The present invention is directed to an apparatus or a method thereof for precisely determining an orientation of an imaging apparatus by determining whether acceleration is applied to the imaging apparatus due to a gravitational force or due to an external force other than the gravitational force.

According to an aspect of the present invention, an imaging apparatus includes an imaging unit configured to convert an object image to an image signal, a vibration detection unit configured to detect a vibration and output information about the vibration, a correction unit moving in a plane orthogonal to an optical axis configured to correct the vibration, a target position calculation unit configured to calculate a target position to which the correction unit is moved based on the information about the vibration output from the vibration detection unit, a position detection unit configured to detect a present position of the correction unit, a calculation unit configured to calculate a difference between the present position and the target position, and a determination unit configured to determine whether a force acting on the imaging apparatus is a gravitational force based on the information about the vibration and a cycle of the vibration.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A through 4D are views illustrating orientations of the imaging apparatus according to the exemplary embodiment of the present invention.

FIGS. 5A through 5F are views illustrating variations in the orientation of the imaging apparatus according to the exemplary embodiment of the present invention.

DETAILED DESCRIPTION OF THE EMBODIMENTS

Various exemplary embodiments, features, and aspects of the invention will be described in detail below with reference to the drawings.

Figure 1:
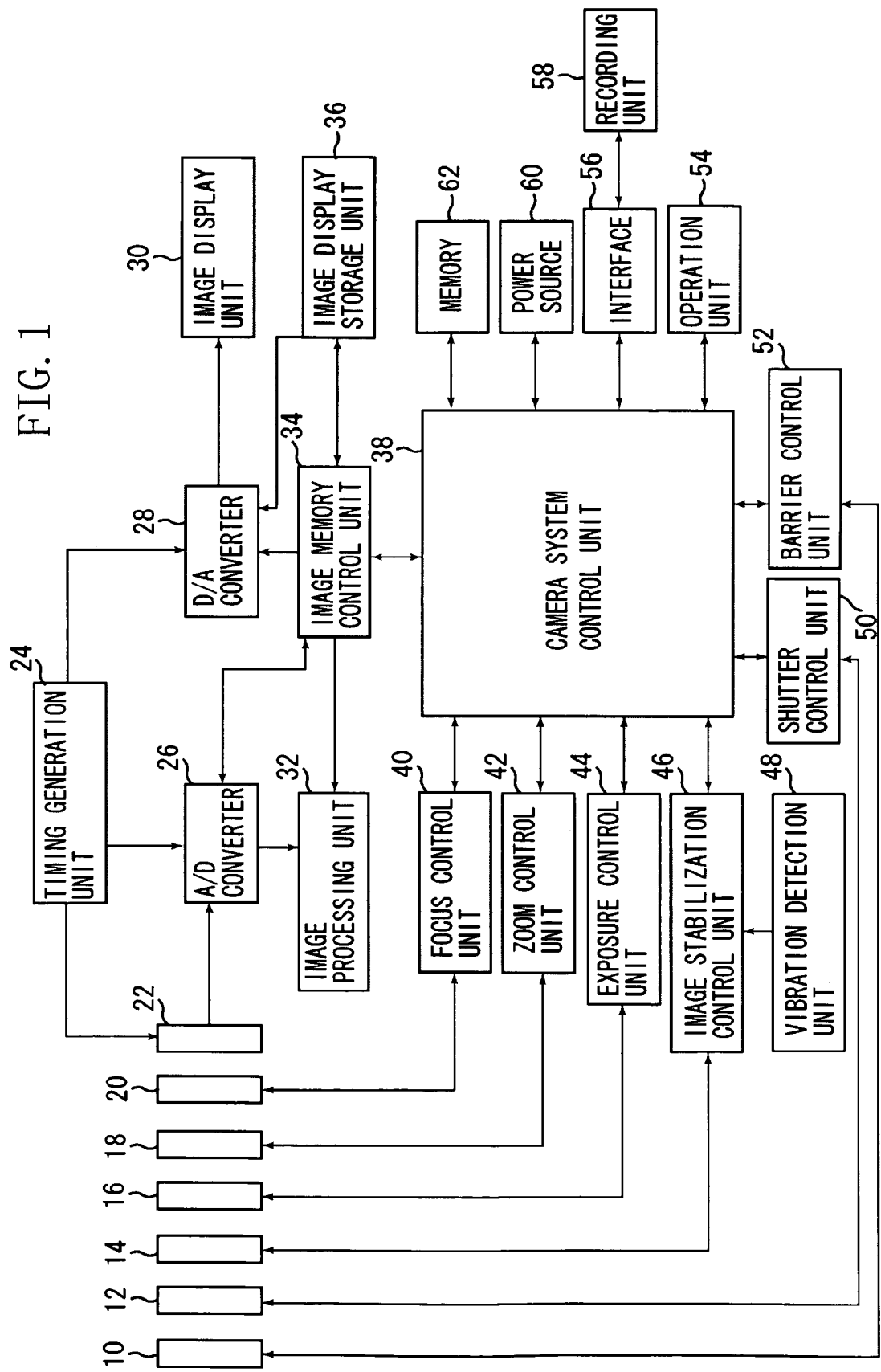
FIG. 1 is a block diagram illustrating an imaging apparatus according to an exemplary embodiment of the present invention.

FIG. 1 is a view illustrating a circuit configuration of an imaging apparatus according to an exemplary embodiment of the present invention. In FIG. 1, a barrier 10 protects a photographic lens. A barrier control unit 52 controls an operation of the barrier 10. A shutter control unit 50 controls opening/closing of a shutter 12. A correction lens 14 corrects a vibration. An image stabilization control unit 46 moves the correction lens 14 within a plane orthogonal to an optical axis to perform a correction of the vibration. An exposure control unit 44 controls an operation of a diaphragm 16. A zoom control unit 42 controls a zoom lens 18 to change zoom magnification. A focus control unit 40 controls a focus lens 20 to adjust focus.

An image sensor 22 converts an optical image into an electric signal. A timing generation unit 24 supplies clock signals to the image sensor 22, an analog-to-digital (A/D) converter 26, and a digital-to-analog (D/A) converter 28, respectively. An image memory control unit 34 controls the A/D converter 26, the D/A converter 28, an image processing unit 32, and an image display storage unit 36, respectively. The image processing unit 32 performs a predetermined interpolating process and color conversion process on data from the A/D converter 26 or data from the image memory control unit 34.

The data of the A/D converter 26 is written into the image display storage unit 36 via both the image processing unit 32 and the image memory control unit 34 or via only the image memory control unit 34. Display image data written in the image display storage unit 36 is displayed by the image display unit 30 via the D/A converter 28. An electronic finder function can be realized by sequentially displaying photographed image data on the image display unit 30.

A camera system control unit 38 controls the focus control unit 40, the zoom control unit 42, the exposure control unit 44, the shutter control unit 50, and the barrier control unit 52. A memory 62 has a memory capacity sufficient to store a predetermined number of still images and a predetermined time length of moving images. Further, the memory 62 can be used as a work area of the camera system control unit 38.

A power source 60 includes a battery detection circuit, a direct current-to-direct current (DC/DC) converter, a switching circuit for switching blocks to be energized, and the like. The power source 60 detects presence and absence of a battery, a type of the battery, and an remaining amount of the battery, and controls the DC/DC converter based on a detection result and an instruction of the camera system control unit 38 to supply a required voltage to each of the units including a recording medium for a required time period. A recording unit 58 establishes access to the camera system control unit 38 via an interface (I/F) 56 which is an interface to the recording medium such as a memory card and a hard disk.

An operation unit 54 includes various buttons, a touch panel, and the like. For example, a mode switching button, a zoom button, a release button, a menu button, a macro button, a flush-setting button, a single shooting/continuous shooting/self-timer switching button, and a photographic image quality selection button are included.

Figure 2:
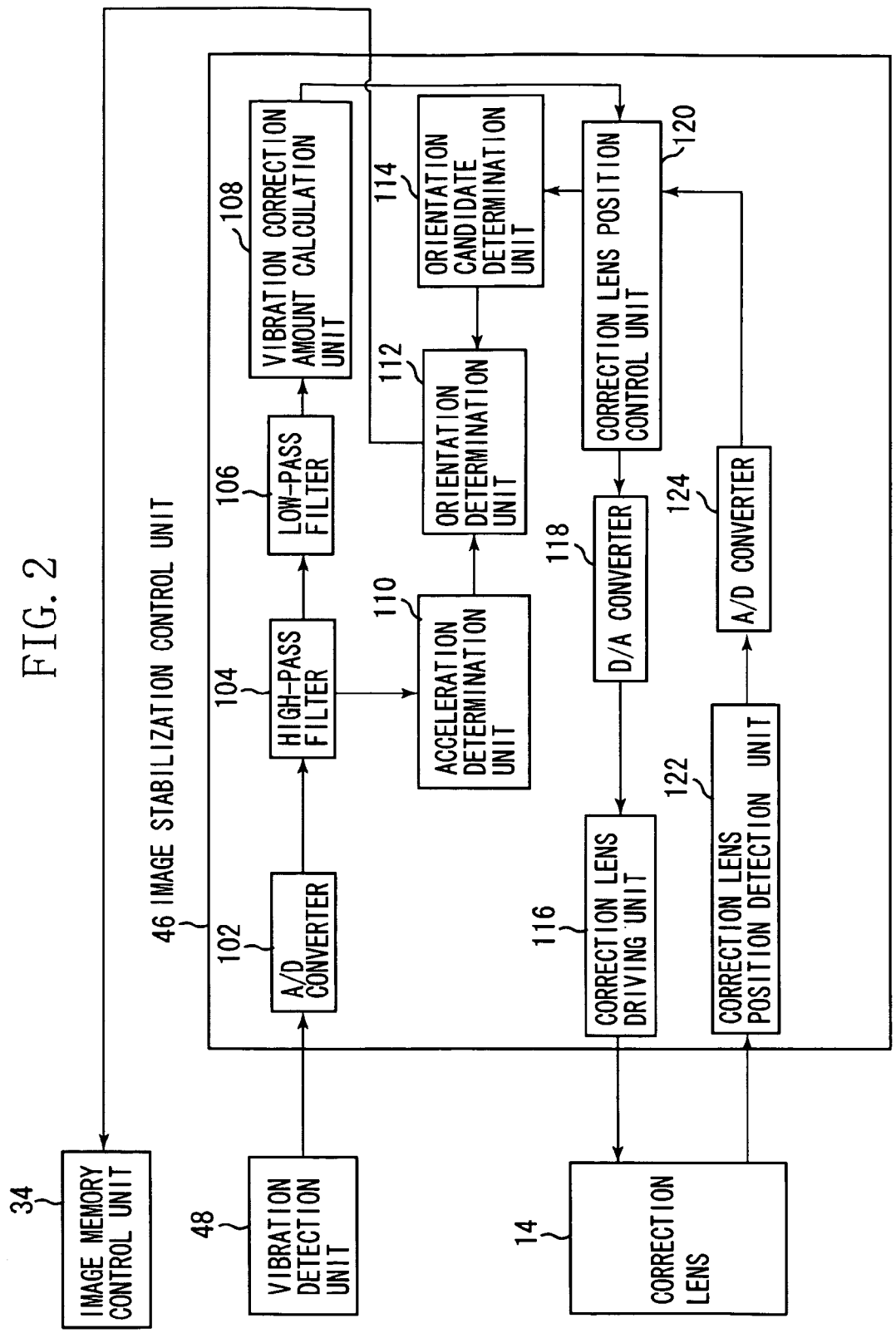
FIG. 2 is a view illustrating a circuit configuration of an image stabilizing control unit and vicinity thereof of FIG. 1.
Figure 3:
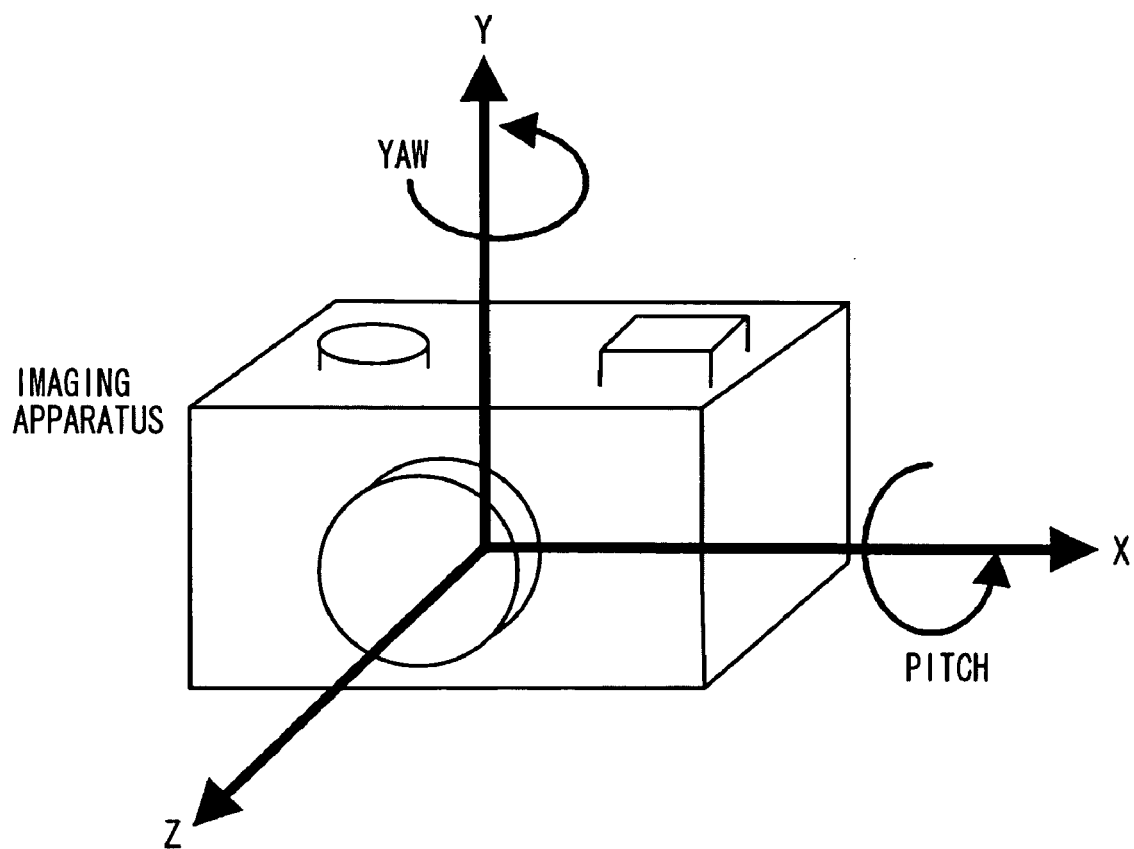
FIG. 3 is a view illustrating a vibration direction of the imaging apparatus according to the exemplary embodiment of the present invention.

FIG. 2 is a block diagram illustrating the image stabilizing control unit 46 of FIG. 1 in more detail. The correction lens 14 is held by a movable member. The vibration detection unit 48 is a device for detecting an angular velocity (for example, a gyro sensor) which detects angular velocity data and outputs the detected data as a voltage value. An A/D converter 102 for detecting the angular velocity converts analogue data output by the vibration detection unit 48 into digital data. A DC component cutoff high-pass filter (HPF) 104 cuts a DC component of the angular velocity data corresponding to a target frequency by switching a cutoff frequency. An integration low-pass filter (LPF) 106 integrates the angular velocity data and converts the data into angular data. A vibration correction amount calculation unit 108 changes a property corresponding to a driving range of the correction lens 14 by using an opposite direction of the angular data as a vibration correction amount, and calculates the vibration correction amount. The data from the vibration correction amount calculation unit 108 is output to the correction lens position control unit 120.

A correction lens position detection unit 122 detects a present position of the correction lens 14 and outputs it as a voltage value. An A/D converter 124 for detecting a position of the correction lens converts analog data output from the correction lens position detection unit 122 into digital data. A signal for driving the correction lens 14 is finally converted into analog data via a D/A converter 118 for driving the correction lens and the converted data is output to a correction lens driving unit 116. The correction lens driving unit 116 moves the correction lens 14 within a plane orthogonal to an optical axis by an amount corresponding to the input driving signal.

A correction lens position control unit 120 performs a feedback control in which a difference between the vibration correction amount and the present position data detected by the correction lens position detection unit 122 is obtained and a deviation thereof is reduced to zero. Generally, the deviation includes an offset component, and there are controlling methods such as a proportional-derivative (PD) control which does not remove the offset component and a proportional-integral-derivative (PID) control which performs an integral process as an example of an offset control process for asymptotically reducing the offset component to zero. In an operation of the feedback control, a proportional control to multiply a constant of proportion, a derivative control to perform time differentiation, and an integrating control to perform time integral are performed with respect to the deviation which is the difference between the vibration correction amount and the present position data. An operational result of the integrating control is the offset component. The PD control is a feedback control in which a sum of the operational results of the proportional control and the differential control is regarded as a final traveling amount of the lens, and the PID control is a feedback control in which a sum of the operational results including the offset component is regarded as the final traveling amount of the lens. An orientation candidate determination unit 114 determines orientation candidates by using the deviation or the offset component. Since the following description is common to both cases of using the deviation and the offset component, the description will be made by using the deviation if not otherwise specified.

The orientation candidates are described with reference to FIGS. 4A through 4D.

In a normal orientation among the orientation candidates (see FIG. 4A), a deviation in a pitch direction is present in a negative direction with respect to the center (the optical axis of the photographic lens), and a deviation in a yaw direction is present within a predetermined vicinity of the center. In a vertical orientation with the right side up among the orientation candidates (see FIG. 4B), the deviation in the yaw direction is present in a positive direction with respect to the center, and the deviation in the pitch direction is present within the predetermined vicinity of the center. In a vertical orientation with the left side up among the orientation candidates (see FIG. 4C), the deviation in the yaw direction is present in the negative direction with respect to the center, and the deviation in the pitch direction is present within the predetermined vicinity of the center.

Orientations other than the above are referred to as other orientations, which include an upside-down orientation (see FIG. 4D).

Returning to FIG. 2, an acceleration determination unit 110 determines whether a force acting on the correction lens 14 is a gravitational force or acceleration using the data passed through the DC component cutoff HPF 104.

A case where the gravitational force acts on the correction lens will be described below with reference to FIGS. 5E and 5F. Vibration signals instantaneously fluctuate in both the pitch direction and the yaw direction as shown in FIGS. 5E and 5F. This is because the vibration detection unit 48 responds to a movement when the orientation is changed.

Figure 6A:
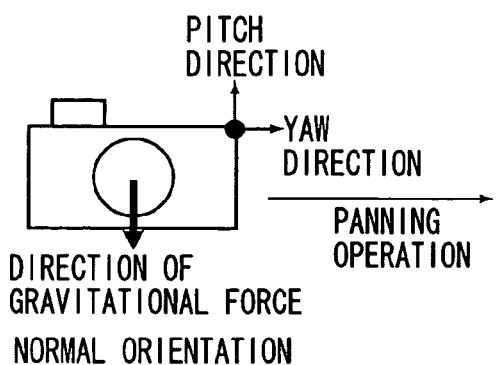
FIGS. 6A through 6F are views illustrating a case where a predetermined acceleration is applied to the imaging apparatus according to the exemplary embodiment of the present invention.
Figure 6B:
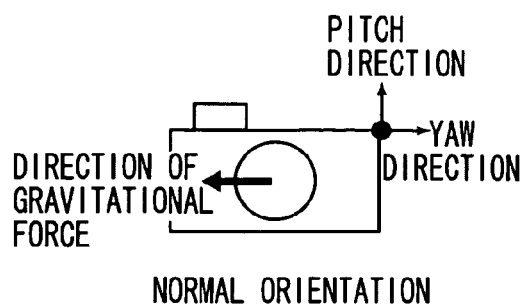
Figure 6C:
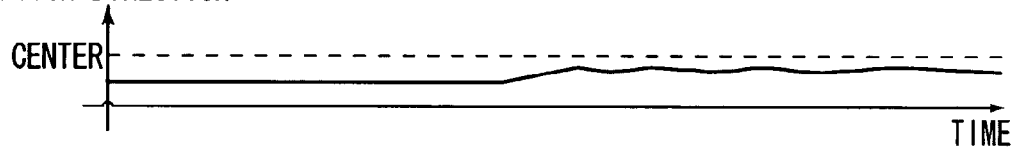
Figure 6D:
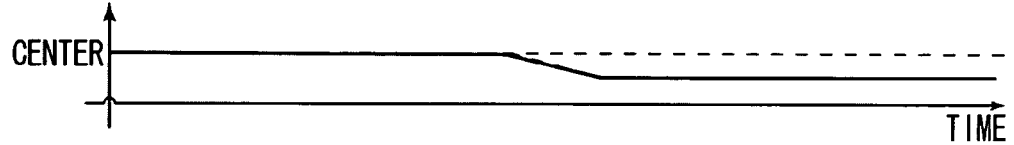
Figure 6E:
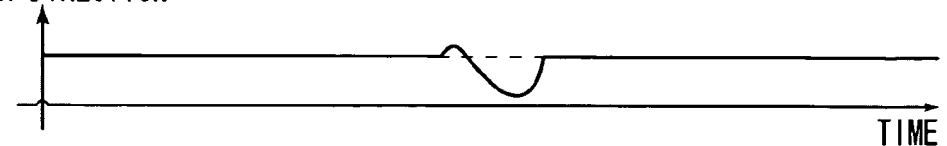
Figure 6F:
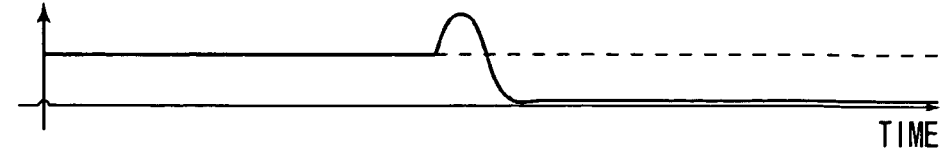

On the other hand, a case where acceleration acts on the correction lens will be described below. The vibration signal in the yaw direction continuously exceeds a predetermined level for predetermined time as illustrated in FIG. 6F, while the vibration signal in the pitch direction fluctuates instantaneously as illustrated in FIG. 6E. This is because an inertial force acts on the correction lens 14 when a predetermined acceleration is applied to the correction lens 14.

An orientation determination unit 112 determines an orientation of the imaging apparatus by combining the determination results obtained from the orientation candidate determination unit 114 and the acceleration determination unit 110. The determined orientation is output to the image memory control unit 34. Then, the image memory control unit 34 switches an orientation of an image to be photographed or a photographed image in accordance with the orientation of the imaging apparatus.

Operations of the imaging apparatus having the above-described configuration will be described with reference to the flowcharts of FIGS. 7 and 8.

Figure 7:
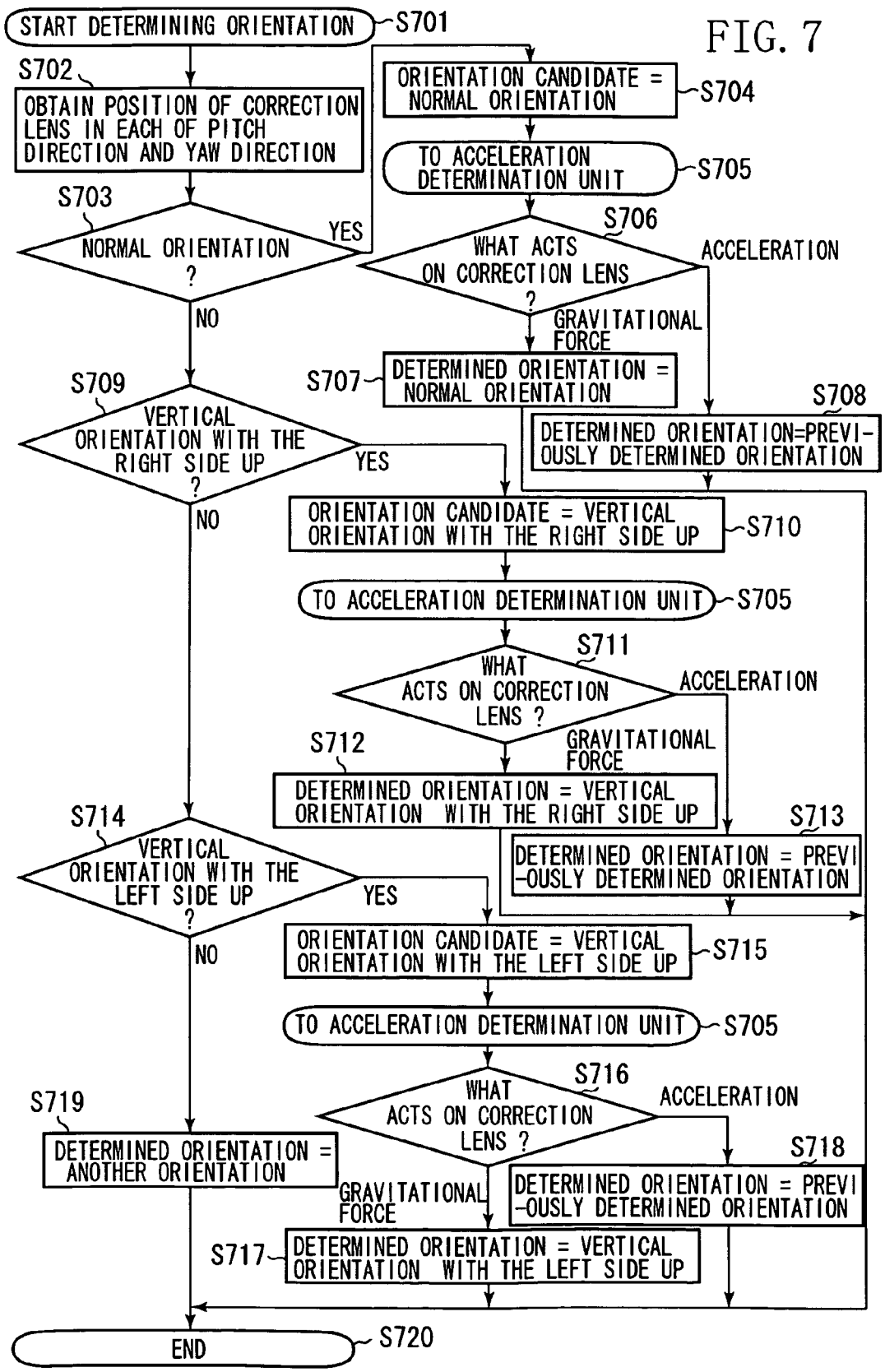
FIG. 7 is a flowchart illustrating operations of the imaging apparatus according to the exemplary embodiment of the present invention.

The flowchart of FIG. 7 illustrates the following operations. That is, the correction lens position detection unit 122 detects positional information about the correction lens 14 as an analog signal. The A/D converter 124 converts the analog signal into a digital signal and sends the converted digital signal to the orientation candidate determination unit 114 via the correction lens position control unit 120, so that the orientation candidate determination unit 114 determines the orientation candidate. The A/D converter 102 converts the orientation candidate and information about the vibration from the vibration detection unit 48, from the analog signals into digital signals, respectively, and sends the converted digital signals to the acceleration determination unit 110 via the HPF 104. Then, orientation determination is performed by using the converted signals and the acting on the correction lens 14 obtained by the acceleration determination unit 110. This process is performed at a predetermined cycle.

In step S701, the imaging apparatus starts an operation of determining the orientation. In step S702, the correction lens position detection unit 122 obtains a position of the correction lens 14 in each of the pitch direction and the yaw direction. The pitch direction and the yaw direction are examples of the most typical directions which orthogonally cross each other within a plane orthogonal to an optical axis given to the imaging apparatus. When mutually orthogonal directions other than a combination of the pitch direction and the yaw direction are considered, a component of the pitch direction and a component of the yaw direction can be calculated based on a vector sum of the directions. Therefore, the combination of the pitch direction and the yaw direction will be hereinafter described.

In the correction lens position control unit 120, the deviation is obtained which is the difference between the target position calculated based on the output of the vibration detection unit 48 and the present position output from the correction lens position detection unit 122. The obtained deviation is output to the orientation candidate determination unit 114. Alternatively, the correction lens position control unit 120 obtains the deviation in a manner as described above, and then outputs an offset which is obtained by a process for asymptotically reducing the deviation to zero, for example, an integral process for calculating an accumulation of the deviation over time, to the orientation candidate termination unit 114. In either of the cases, since a flow of the flowcharts and contents of the processes do not change while predetermined thresholds may vary in the following processes, the description will be made based on the case of the deviation.

In step S703, the orientation candidate determination unit 114 determines whether the present orientation candidate is the normal orientation based on the deviation of the correction lens 14. The normal orientation is defined such that the deviation in the pitch direction is present in the negative direction with respect to the center, and the deviation of the correction lens 14 in the yaw direction is present within the predetermined vicinity of the center. When the orientation candidate is not the normal orientation (NO in step S703), the process goes to step S709, as described above with reference to FIG. 4A. When the orientation candidate is the normal orientation (YES in step S703), the process goes to step S704. In step S704, the orientation candidate determination unit 114 assigns the normal orientation to the orientation candidate as a variable. Then, in step S705, the process jumps to processing in the acceleration determination unit 110. The acceleration determination unit 110 obtains an angular velocity signal and determines whether the gravitational force acts on the correction lens 14, or the inertial force due to the applied acceleration acts on the correction lens 14 based on the information about the angular velocity signal. This process will be described below in detail with reference to FIG. 8.

In step S706, the acceleration determination unit 110 determines whether the force acting on the correction lens 14 is the gravitational force or the acceleration. When the gravitational force acts on the correction lens 14 (GRAVITATIONAL FORCE in step S706), the process goes to step S707. In step S707, the orientation determination unit 112 assigns the normal orientation to the determined orientation as a variable. On the other hand, when the acceleration acts on the correction lens 14 (ACCELERATION in step S706), the process goes to step S708. In step S708, the orientation determination unit 112 assigns the orientation determined in a previous cycle to the determined orientation as the variable. Then, the process goes to step S720, where the orientation determination unit 112 ends the orientation determination.

The process goes from step S703 to step S709 when the orientation candidate is not the normal orientation. In step S709, the orientation candidate determination unit 114 determines whether the present orientation candidate is the vertical orientation with the right side up based on the deviation of the correction lens 14. The vertical orientation with the right side up is defined such that the deviation of the correction lens 14 in the yaw direction is present in the positive direction with respect to the center, and the deviation of the correction lens 14 in the pitch direction is present within the predetermined vicinity of the center as described above with reference to FIG. 4B. When the orientation candidate is not the vertical orientation with the right side up (NO in step S709), the process goes to step S714. When the orientation candidate is the vertical orientation with the right side up (YES in step S709), the process goes to step S710. In step S710, the orientation candidate determination unit 114 assigns the vertical orientation with the right side up to the orientation candidate as the variable. Then, the process goes to step S705 to jump to the below-described process of the acceleration determination unit 110.

Then, the process goes to step S711 and the acceleration determination unit 110 determines whether the force acting on the correction lens 14 is the gravitational force or the acceleration. When the gravitational force acts on the correction lens 14 (GRAVITATIONAL FORCE in step S711), the process goes to step S712. In step S712, the orientation determination unit 112 assigns the vertical orientation with the right side up to the determined orientation as the variable. On the other hand, when the acceleration acts on the correction lens 14 (ACCELERATION in step S711), the process goes to step S713. In step S713, the orientation determination unit 112 assigns the orientation defined by the previous cycle to the determined orientation as the variable. Then, the process goes to step S720, where the orientation determination unit 112 ends the orientation determination.

The process goes from step S709 to step S714 when the orientation candidate is not the vertical orientation with the right side up. In step S714, the orientation candidate determination unit 114 determines whether the present orientation candidate is the vertical orientation with the left side up based on the deviation of the correction lens 14. The vertical orientation with the left side up is defined such that the deviation of the correction lens 14 in the yaw direction is present in the negative direction with respect to the center, and the deviation of the correction lens 14 in the pitch direction is present in the predetermined vicinity of the center, as described above with reference to FIG. 4C. When the orientation candidate is not the vertical orientation with the left side up (NO in step S714), the process goes to step S719. When the orientation candidate is the vertical orientation with the left side up (YES in step S714), the process goes to step S715. In step S715, the orientation candidate determination unit 114 assigns the vertical orientation with the left side up to the orientation candidate as the variable. Then in step S705, the process jumps to the below-described process of the acceleration determination unit 110.

Then, the process goes to step S716 and the acceleration determination unit 110 determines whether the force acting on the correction lens 14 is the gravitational force or the acceleration. When the gravitational force acts on the correction lens 14 (GRAVITATIONAL FORCE in step S716), the process goes to step S717. In step S717, the orientation determination unit 112 assigns the vertical orientation with the left side up to the determined orientation as the variable. On the other hand, when the acceleration acts on the correction lens 14 (ACCELERATION in step S716), the process goes to step S718. In step S718, the orientation determination unit 112 assigns the orientation defined in the previous cycle to the determined orientation as the variable. Then, the process goes to step S720, where the orientation determination unit 112 ends the orientation determination.

In step S714, when the orientation candidate is not the vertical orientation with the left side up, the process goes to step S719. More specifically, when the orientation candidate is neither the normal orientation in step S703, the vertical orientation with right side up in step S709 (NO in step S709), nor the vertical orientation with the left side up in step S714 (NO in step S714), the process goes to step S719. Then, in step S719, the orientation determination unit 112 assigns another orientation to the determined orientation as the variable. Here, the other orientation as the determined orientation determination corresponds to, as illustrated in FIG. 4D, a case of the upside-down orientation or a case where the imaging apparatus is tilted forward or backward. The process subsequently goes to step S720, where the orientation determination unit 112 ends the orientation determination.

Next, an acceleration determination process executed in step S705 of FIG. 7 will be described below with reference to the flowchart of FIG. 8.

In step S801, the acceleration determination unit 110 starts to determine the acceleration. In step S802, the acceleration determination unit 110 determines whether the orientation candidate is the normal orientation. When the orientation candidate is the normal orientation (YES in step S802), the process goes to step S803 and the acceleration determination unit 110 obtains the angular velocity signal in the pitch direction. When the orientation candidate is not the normal orientation (NO in step S802), the process goes to step S804 and the acceleration determination unit 110 obtains the angular velocity signal in the yaw direction.

Then, in step S805, the acceleration determination unit 110 compares an absolute value of the angular velocity signal with a predetermined level of the angular velocity signal. When a level of the angular velocity, namely the absolute value of the angular velocity signal, is lower than the predetermined level of the angular velocity (YES in step S805), it can be considered that the acceleration applied to the imaging apparatus is minute and the orientation was changed in a relatively slow manner. In this case, the process goes to step S807, and the acceleration determination unit 110 clears a time counter which is a variable representing a cycle of the vibration. Then, in step S811, the acceleration determination unit 110 determines that the force acting on the correction lens 14 is the gravitational force.

On the other hand, when the level of the angular velocity is higher than the predetermined level of the angular velocity (NO in step S805), the acceleration determination unit 110 determines that the acceleration applied to the imaging apparatus is large, and therefore, the process goes to step S806 in order to determine how long the acceleration has been applied. In step S806, the acceleration determination unit 110 updates the time counter as the variable. In step S808, the acceleration determination unit 110 compares time indicated by the time counter with the predetermined time. When the time counter indicates time shorter than the predetermined time (YES in step S808), it can be considered that the acceleration applied to the imaging apparatus was large but instantaneous. In this case, the process goes to step S810, and the acceleration determination unit 110 determines that the force acting on the correction lens 14 is the gravitational force.

On the other hand, when the time counter indicates time longer than the predetermined time (NO in step S808), it can be considered that the acceleration applied to the imaging apparatus was large and long. In this case, the process goes to step S809, and the acceleration determination unit 110 determines that the force acting on the correction lens 14 is the acceleration.

The determination of the force acting on the correction lens 14 is continuously used when the process returns to the flowchart of FIG. 7. Then, the process goes to step S812, where the acceleration determination unit 110 ends the acceleration determination.

Figure 8:
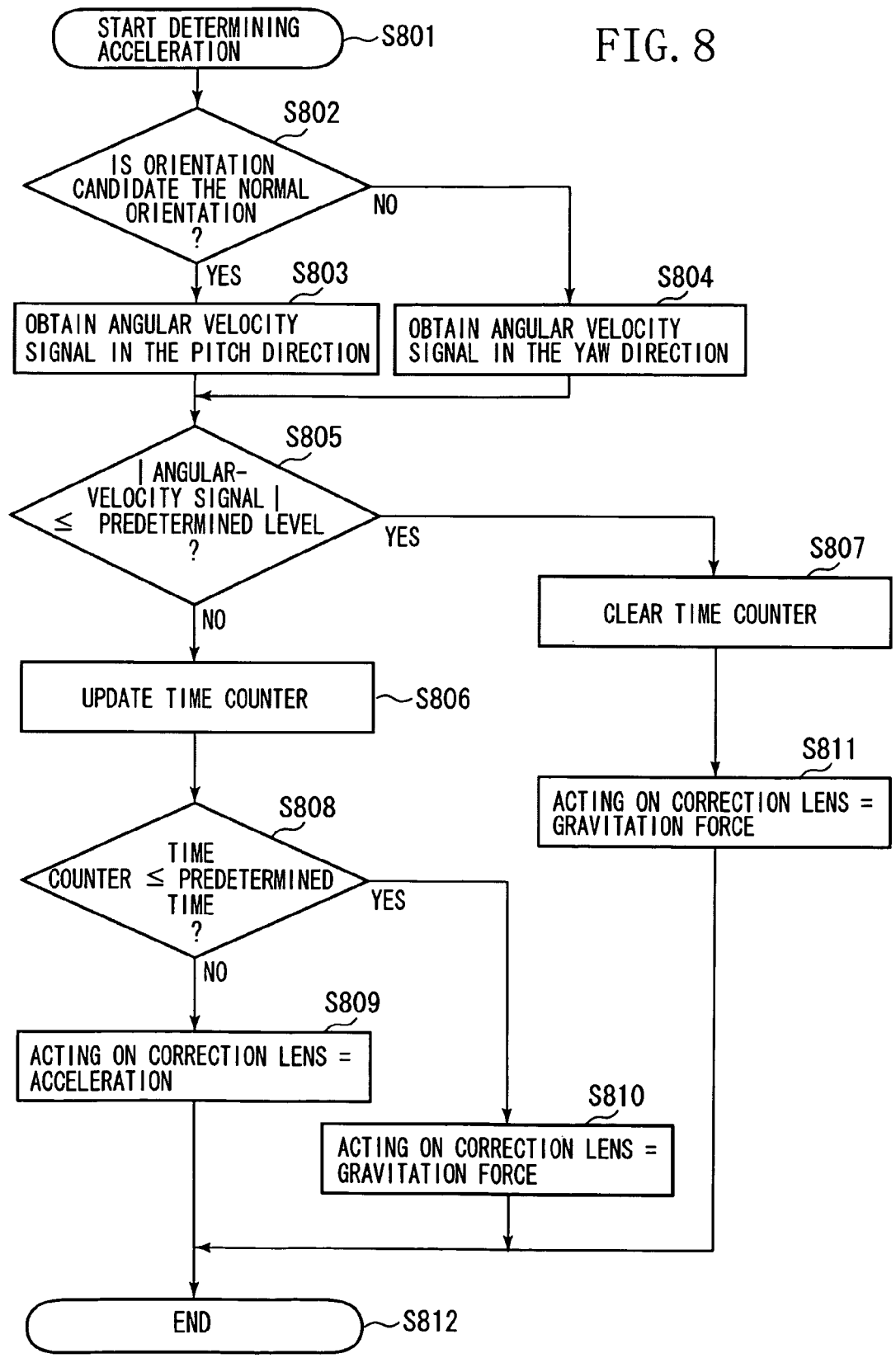
FIG. 8 is a flowchart illustrating a detailed acceleration determination process at step S705 of FIG. 7.

According to the processes in the flowcharts of FIGS. 7 and 8, when the force acting on the correction lens 14 held by the movable member is the gravitational force, the camera system control unit 38 sends an instruction to the image memory control unit 34 to switch an image according to the orientation of the imaging apparatus. On the other hand, when the force acting on the correction lens 14 is the acceleration, the camera system control unit 38 does not send an instruction to the image memory control unit 34 to switch an image.

Alternatively, when the force acting on the correction lens 14 held by the movable member is the acceleration, the camera system control unit 38 outputs an instruction to the image memory control unit 34 in accordance with the most recent information at the time when the force acting on the correction lens 14 was the gravitational force.

The exemplary embodiment of the present invention can be achieved with the following method. A storage medium (or a recording medium) which stores a program code of software for executing a function of the above-described exemplary embodiment is supplied to a system or an apparatus. Then, a computer (or a central processing unit (CPU), or a micro processing unit (MPU)) installed in the system or the apparatus reads out and executes the program code stored in the storage medium. In this case, the program code itself which is read out from the storage medium realizes the function of the above-described exemplary embodiment, and thus the storage medium storing the program code constitutes the present invention. Further, the function of the above-described exemplary embodiment can be realized by executing the program code read out by the computer and also by the following case. An operating system (OS) or the like working on the computer carries out a part of or the entirety of an actual process based on an instruction of the program code, and the function of the above-described exemplary embodiment can be realized by the process.

Further, the present invention encompasses the following case. The program code read out from the storage medium is written into an expansion card inserted into a computer or a memory of an expansion unit connected to a computer. Then, the CPU in the expansion card, the expansion unit, or the like carries out a part of or the entirety of an actual process based on an instruction of the program code to realize the function of the above-described exemplary embodiment.

The present invention is applied to the above storage medium and the program code corresponding to the above-described process stored in the storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-322847 filed Dec. 14, 2007, which is hereby incorporated by reference herein in its entirety.

What is claimed is:

1. An imaging apparatus comprising:
   an imaging unit configured to convert an object image into an image signal;
   a vibration detection unit configured to detect a vibration and output information about the vibration;
   a correction unit moving in a plane orthogonal to an optical axis configured to correct the vibration;
   a target position calculation unit configured to calculate a target position to which the correction unit is moved based on the information about the vibration output from the vibration detection unit;
   a position detection unit configured to detect a present position of the correction unit;
   a calculation unit configured to calculate a difference between the present position and the target position; and
   a determination unit configured to determine whether a force acting on the imaging apparatus is a gravitational force based on the information about the vibration and a cycle of the vibration;
   wherein the determination unit determines that the force acting on the imaging apparatus is the gravitational force when the difference changes, if the information about the vibration is equal to or less than a predetermined value, or even if the information about the vibration is greater than the predetermined value but the cycle of the vibration is equal to or smaller than predetermined time.

2. The imaging apparatus according to claim 1, wherein the determination unit determines that the force acting on the imaging apparatus is a force other than the gravitational force when the difference changes, if the information about the vibration is greater than the predetermined value and the cycle of the vibration is longer than the predetermined time.

3. An imaging apparatus comprising:
   an imaging unit configured to convert an object image into an image signal;
   a vibration detection unit configured to detect a vibration and output information about the vibration;
   a correction unit moving in a plane orthogonal to an optical axis configured to correct the vibration;
   a target position calculation unit configured to calculate a target position to which the correction unit is moved based on the information about the vibration output from the vibration detection unit;
   a position detection unit configured to detect a present position of the correction unit;
   a calculation unit configured to calculate a difference between the present position and the target position;
   a determination unit configured to determine whether a force acting on the imaging apparatus is a gravitational force based on the information about the vibration and a cycle of the vibration;
   an orientation determination unit configured to determine an orientation of the imaging apparatus, wherein the orientation determination unit determines that the orientation is changed in a case where a force acting on the imaging apparatus by the determination unit is gravitational force, and determines that the orientation is not changed in a case where a force acting on the imaging apparatus is other than gravitational force.

4. The imaging apparatus according to claim 3, wherein the determination unit determines that the force acting on the imaging apparatus is the gravitational force when the difference changes, if the information about the vibration is equal to or less than a predetermined value, or even if the information about the vibration is greater than the predetermined value but the cycle of the vibration is equal to or smaller than predetermined time.

5. The imaging apparatus according to claim 4, wherein the determination unit determines that the force acting on the imaging apparatus is a force other than the gravitational force when the difference changes, if the information about the vibration is greater than the predetermined value and the cycle of the vibration is longer than the predetermined time.

6. The imaging apparatus according to claim 3, further comprising an image orientation switching unit configured to switch an image orientation to be displayed based on the orientation determined by the orientation determination unit.

7. A method of controlling an imaging apparatus having a correction unit moving in a plane orthogonal to an optical axis configured to correct a vibration, the method comprising:
converting an object image into an image signal;
detecting a vibration and outputting information about the vibration;
calculating a target position to which the correction unit is moved based on the information about the vibration;
detecting a present position of the correction unit;
calculating a difference between the present position and the target position;
determining whether a force acting on the imaging apparatus is a gravitational force based on the information about the vibration and a cycle of the vibration; and
determining an orientation of the imaging apparatus, wherein it is determined that the orientation is changed in a case where a force acting on the imaging apparatus is gravitational force, and determined that the orientation is not changed in a case where a force acting on the imaging apparatus is other than gravitational force.

8. A non-transitory computer-readable medium containing computer-executable instructions for controlling an imaging apparatus having a correction unit moving in a plane orthogonal to an optical axis configured to correct a vibration, the medium comprising:
computer-executable instructions for converting an object image into an image signal;
computer-executable instructions for detecting a vibration and outputting information about the vibration;
computer-executable instructions for calculating a target position to which the correction unit is moved based on the information about the vibration;
computer-executable instructions for detecting a present position of the correction unit;
calculating a difference between the present position and the target position;
computer-executable instructions for determining whether a force acting on the imaging apparatus is a gravitational force based on the information about the vibration and a cycle of the vibration; and
computer-executable instructions for determining an orientation of the imaging apparatus, wherein it is determined that the orientation is changed in a case where a force acting on the imaging apparatus is gravitational force, and determined that the orientation is not changed in a case where a force acting on the imaging apparatus is other than gravitational force.

* * * * *